INVENTOR:
JOHANNES E. RIJNSDORP

March 19, 1968 J. E. RIJNSDORP 3,374,152
APPARATUS FOR THE AUTOMATIC CONTROL OF THE QUALITY
OF THE SEPARATION IN A DISTILLATION PROCESS BY
MAINTAINING A CONSTANT RATIO OF
VAPOR FLOW TO REFLUX FLOW Filed Jan. 18, 1965

INVENTOR:
JOHANNES E. RIJNSDORP
BY:
HIS ATTORNEY

United States Patent Office 3,374,152
Patented Mar. 19, 1968

3,374,152
APPARATUS FOR THE AUTOMATIC CONTROL OF THE QUALITY OF THE SEPARATION IN A DISTILLATION PROCESS BY MAINTAINING A CONSTANT RATIO OF VAPOR FLOW TO REFLUX FLOW
Johannes E. Rijnsdorp, Amsterdam, Netherlands, assignor to Shell Oil Company, New York, N.Y., a corporation of Delaware
Filed Jan. 18, 1965, Ser. No. 426,268
Claims priority, application Netherlands, Jan. 30, 1964, 64—773
1 Claim. (Cl. 202—158)

ABSTRACT OF THE DISCLOSURE

A method of controlling a distillation column wherein the ratio of internal vapor flow to internal reflux flow is maintained constant by adjusting the external reflux flow. The external reflux flow, top product flow and top product quality are measured and then combined to produce a signal related to the ratio of internal vapor flow to internal reflux flow.

---

Figure 1:
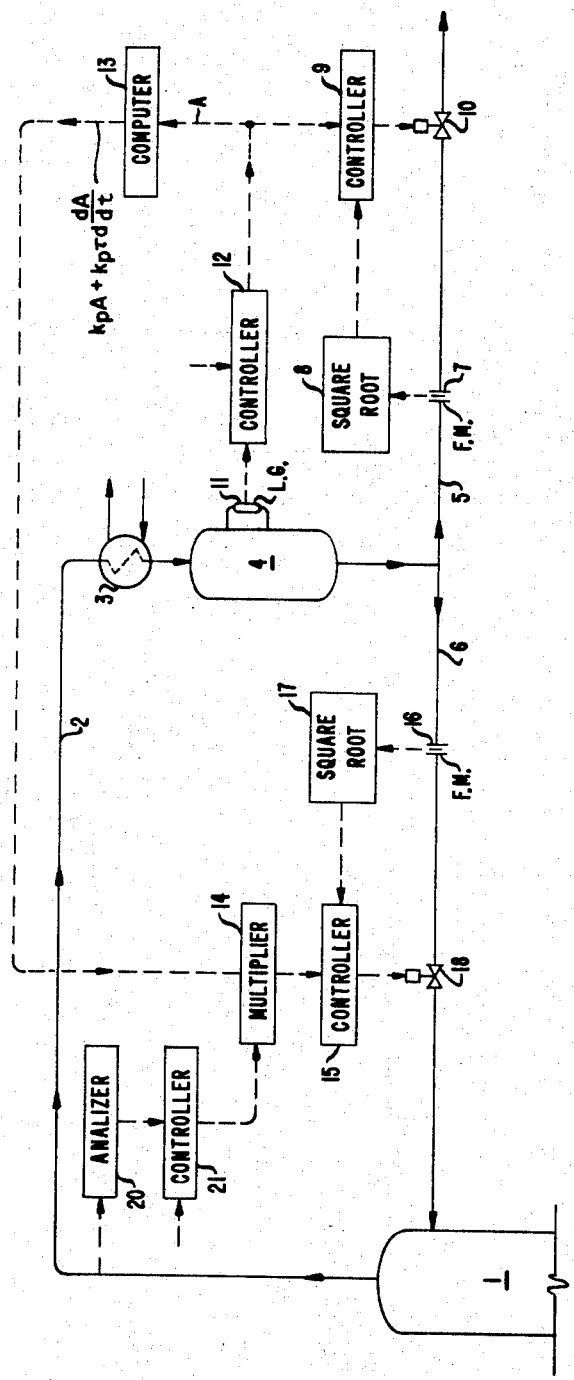

The invention relates to a method and apparatus for the automatic control of the quality of the separation of an intake mixture in a continuously operating distillation column which is provided with an accumulator for the top product and which utilizes reflux and re-evaporation, by keeping the ratio between the reflux flow and the vapor flow from the top of the column constant by adjusting the reflux flow.

A process utilizing reflux control to maintain the quality of separation is already known from the United States Patent No. 2,357,113, issued Aug. 29, 1944. In this patent, it is taught that an essential condition for the control of the quality of the separation is that the ratio between the vapor flow and the reflux flow should be kept constant. This ratio, however, is not controlled directly, but instead the ratio between the reflux flow and the top liquid product flow from the process is kept constant by adjusting the reflux flow and thereby it is intended to keep the desired vapor flow-reflux flow ratio constant. This system, however, does not take into account the variations in the quantity of liquid in the accumulator for the top product and therefor holds only for a stationary or static condition. With such a control scheme, the vapor flow from the top of the column may change and have a different value for relatively long periods of time without the reflux flow changing, so that large deviations from the desired product quality may occur for long periods. Additionally, it cannot be understood how the accumulator can be prevented from becoming empty in the control scheme shown in FIGURE 2 of the patent unless that ratio control system is combined with a system for the control of the accumulator level.

In my copending United States patent application No. 330,753, filed Dec. 16, 1963, and now U.S. Patent No. 3,342,698, FIGURE 13 shows a scheme for a system for controlling the quality of the separation by keeping the ratio between the reflux flow and the top product flow constant by adjusting the reflux flow, while the level of the liquid in the accumulator is kept constant by adjusting the top product flow. The objection raised above against the United States Patent No. 2,357,113 of the top product accumulator becoming full or empty is thus obviated. Nevertheless, in this system also, the reflux flow responds slowly to changes in the vapor flow from the top of the column due to the liquid level gauge having only proportional action, whereby response times of many minutes may occur. Consequently, here too substantial deviations from the desired product quality may result.

The obvious course to eliminate the above problems would be to keep the ratio between the reflux flow and the vapor flow from the top of the column constant by making use of a ratio controller which acts upon signals originating from direct measurements of the two flows. However, the direct measurement of the vapor flow from the top of the column presents difficulties because the result of that measurement is greatly dependent on the pressure and the temperature of the vapor and becomes inaccurate due to condensation of vapor and liquid from the top tray which is carried along by the vapor.

The above problems are eliminated according to the invention wherein a signal originating from a control circuit which causes the top product flow to decrease upon a decrease of the liquid level in the accumulator, and vice versa, is passed to an element or computer having proportional plus differential action, whereupon the resulting signal is multiplied by an adjustable constant value signal related to the desired quality of the separation; the signal thus obtained being the set value for a controller which adjusts the reflux flow.

The result of this process is that the ratio between the vapor flow from the top and the reflux flow is kept constant with a rapid response to changes in those streams, because the signal adjusting the reflux flow incorporates the level of the liquid in the accumulator and the rate of variation of that level. This mode of control therefore takes into account the rate of variation of a buffer supply of liquid, which supply is determined by the algebraic sum of supply and discharge. Thus, the control system according to the invention takes into account the dynamics of the distillation process.

In order to show that the process according to the invention maintains the ratio between the top vapor flow and the reflux flow constant, it is desirable first to give a description of an apparatus suitable for carrying out the process according to the invention. Such an apparatus preferably consists of a gauge for the liquid level in the accumulator for the top product, which gauge is connected to a proportional controller having its output connected to the input for the set value of a controller which has its other input connected to a flow meter for the liquid in the top product discharge line, the output of the latter controller being connected to a control valve in the product discharge line. The output of the controller for the liquid level in the accumulator is likewise connected to a computing element having proportional plus differential action which has its output connected to one input of a circuit which is capable of multiplying the incoming signal by a signal that enters via another input and is related to the desired control ratio. The output of the multiplying circuit is connected to the input for the set value of a controller which has its output connected to a control valve in the reflux line and its other input connected to a meter for the reflux flow.

Figure 2:
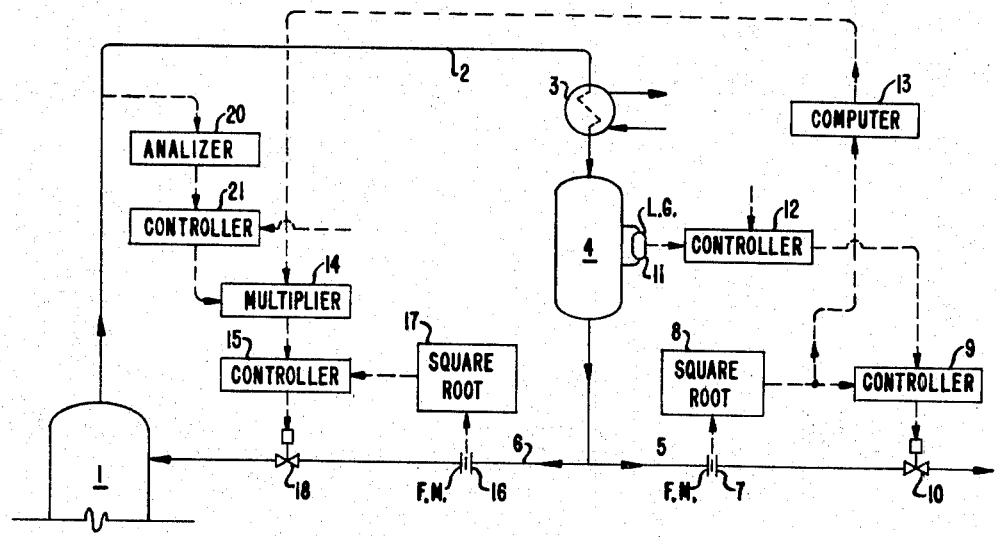
Figure 3:
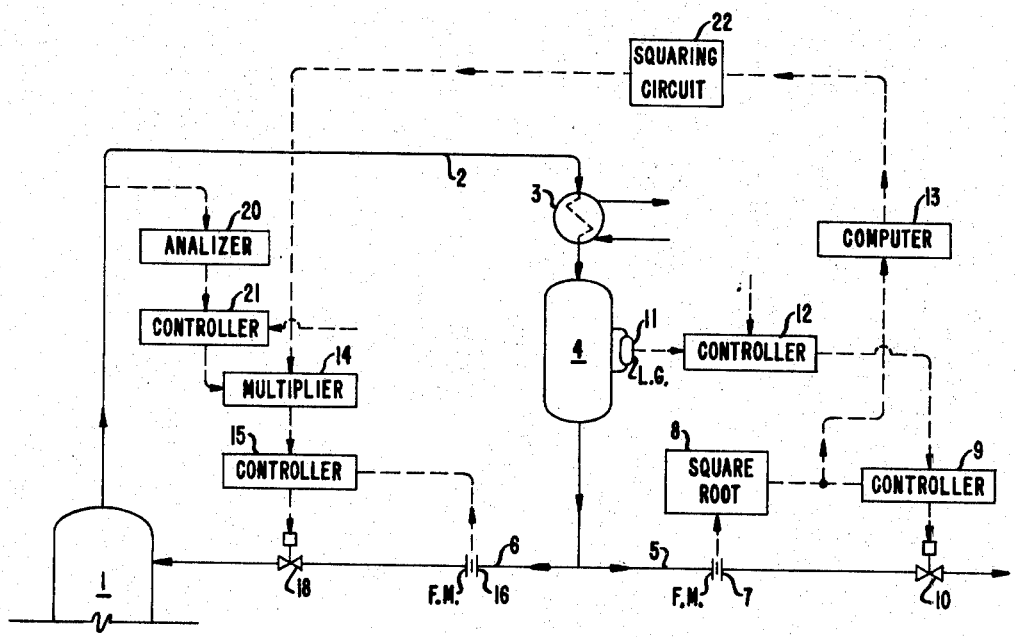

The invention will now be further elucidated by means of the following figures wherein:

FIGURES 1–3 are schematic diagrams of embodiments of distillation column control systems according to the invention.

Referring now to FIGURE 1, there is shown the upper portion of a conventional distillation column 1. Although not shown, it is understood that the input mixture to be distilled is introduced into the column at a lower level, and the column is provided with heat at a lower level for re-evaporation of the fluid in the column. Moreover, it is further understood that, although also not shown, the other process variables, such as feed rate, rate of re-evaporation, bottom product flow, etc., may be controlled in a manner old and well known in the art. The overhead vapors from the column 1 are removed through a conduit 2 which is in communication with a condenser 3 wherein the vapors are condensed and then collected in an accumulator 4. A first portion of the condensed liquid in the accumulator 4 is removed from the distillation process via a conduit 5, and another portion is returned to the upper portion of the column 1 as reflux via the conduit 6.

In order to regulate the flow in conduit 5 and thereby the level in the accumulator 4, the flow of condensed liquid through conduit 5, which constitutes the overhead product withdrawn from the distillation process, is measured by a flowmeter 7. If this meter contains an orifice plate and therefore produces a signal proportional to the square of the flow rate in conduit 5, the outgoing signal is subjected to square root extraction in square root circuit 8 and subsequently passed to a controller 9, the output of which adjusts a valve 10 in the conduit 5. If meter 7, is a linear indicating instrument, square root circuit 8 can be omitted. Connected to the other input of controller 9 is a signal proportional to the change in the accumulator level from the desired liquid level. This signal is developed via a liquid level gauge 11 which is connected to a proportional controller 12 having its output connected to controller 9. The circuit 7–8–9–10 initially maintains the flow of liquid through conduit 5 at a constant value. Upon a rise of the liquid level in accumulator 4, the valve 10 is further opened via the control path 11–12–9 until the level in accumulator 4 is again in agreement with the set value of controller 12. If the level in accumulator 4 should fall, then the control path formed by control elements 11–12–9 tends to further close the valve 10 until the desired level in accumulator 4 is reached. Consequently, the signal coming from controller 12 is a function, which may be linear, of the liquid level in the accumulator 4 and the product flow through conduit 5.

To control the column reflux and hence the quality of the separation according to the invention, the output signal from controller 12 is passed to a computer or computing element 13 which produces an output signal proportional to the sum of the incoming signal and the derivative thereof, i.e., for an input signal A, the output is equal to $$K\left(A + \frac{dA}{dt}\right)$$

This output signal is passed to a multiplier 14 wherein the signal is multipled by a constant, but adjustable, factor which is related to the desired quality of the separation. The output signal from multiplier 14 is connected to the input for the set value of a controller 15 which has its output connected to a valve 18 in the reflux line 6. The other input of controller 15 is connected to a flowmeter 16 for the reflux flow via the square root extracting circuit 17. The observations made in relation to the presence of square root circuit 8 near meter 7 also hold true with respect to the presence of square root circuit 17 near meter 16. The control circuit 16–17–15–18 initially maintains the flow of liquid in conduit 6 at a constant value. Upon a rise of the liquid level in accumulator 4, the valve 18 is farther opened, via control circuit 11–12–13–14–15, until, in cooperation with the circuit 11–12–9–10, the desired level in 4 has been reached again. Owing to the presence of the element 13, which has, inter alia, differential action, valve 18 responds rapidly to changes in the liquid level in accumulator 4. Obviously, should the liquid level in the accumulator 4 fall, then, in a similar manner, control circuit 11–12–13–14–15 will tend to further close the valve 18.

To illustrate that the described control system and mode of control satisfies the requirement that the ratio between the reflux flow through conduit 6 and the vapor flow through conduit 2 remain constant, the following example is presented wherein:

$V$ = top vapor flow
$R$ = reflux flow
$c_L$ = density of the liquid in the accumulator
$A_a$ = cross-sectional area of the accumulator
$\lambda$ = height of liquid level in the accumulator
$D$ = top product flow
$k, k_a, k_b, k_c, k_d, k_p, \tau_d$ = constants The output signal from the proportional level controller 12 is a linear function of the height of the liquid level:

$$k_a + k_b \lambda \quad (1)$$

This signal operates the set value of the controller 9, which is connected to the valve 10 to control the top product flow D, and thus there results a relationship between D and $\lambda$:

$$k_c \cong k_a + k_b \lambda \quad (2)$$

The output signal from controller 12 also passes to the element or computer 13, which has proportional plus differential action and thus produces an output signal:

$$k_p\left((k_a + k_b\lambda) + \tau_d \frac{d(k_a + k_b\lambda)}{dt}\right) \quad (3)$$

By combining Equations 2 and 3 there is obtained:

$$k_p k_c D + k_p \tau_d k_b \frac{d\lambda}{dt} \quad (4)$$

This latter signal passes to the multiplier 14 wherein it is multiplied by an adjustable constant k in order to set the desired value of the ratio $V/R$.

The output signal from the multipler now passes to the set value input of controller 15 which controls the reflux flow R and thus there results a relationship between R and Equation 4:

$$k_d R \cong k\left(k_p k_c D + k_p \tau_d k_b \frac{d\lambda}{dt}\right) \quad (5)$$

If $k_p$ and $\tau_d$ are chosen so that $$\frac{k_p k_c}{k_d} = 1 \text{ and } \frac{k_p \tau_d k_b}{k_d} = c_b A_a \quad (6)$$

Equation 5 can be written as $$\frac{R}{k} = D + c_L A_a \frac{d\lambda}{dt} \quad (7)$$

Comparison of Equation 7 with the mass balance $$V = c_L A_a \frac{d\lambda}{dt} + R + D \quad (8)$$

then yields $$\frac{V}{R} = 1 + \frac{1}{k} \quad (9)$$

from which it follows that $V/R$ is maintained at a constant value.

The control according to the invention of the quality of the separation of a distillation process may further be combined with control systems, which in themselves are known, for, for instance, the pressure, the degree of cooling, the degree of re-evaporation, the level of the liquid in the reboiler.

The constant, but adjustable, factor for the multiplying element 14 thus determines the value of the ratio between vapor flow and reflux flow. It is often advantageous for this factor to be derived from a controller for the quality of the separation. For example, the adjustable constant k can be derived from a controller 21 which has its input connected to a quality analyzer connected to the flow line 2 or any other place in the column where an analysis of the quality of the separation can be made, e.g. a tray in the column. The result of this then will be that the ratio between vapor flow and reflux flow always remains automatically adapted to the desired quality with slow variations in the system. Thus there is obtained a product of contsant quality, even in the case where a change of the ratio between vapor flow and reflux flow is required, for instance owing to a change in the composition of the feed.

A variant of the scheme of FIGURE 1 is shown in FIGURE 2. The only difference between the two schemes lies in the connection of the input of control element or computer 13. According to the control scheme of FIGURE 2, instead of the output of the controller 12 being used as the input signal to computer 13, the output signal of the square root circuit 8, or, if meter 7 is a linear instrument, the direct output signal of meter 7 is utilized as the desired input signal.

With this control scheme, the output signal from square root circuit 8 which can be represented by $k_cD$, is passed to computer 13 which has proportional plus differential action, so that the output signal thereof becomes:

$$k_p\left(k_cD+\tau_d\frac{d(k_cD)}{dt}\right) \quad (10)$$

By combining this equation with Equation 2, which equation also holds true, it follows that:

$$k_pk_cD+k_p\tau_dk_b\frac{d\lambda}{dt} \quad (11)$$

which equation is identical with Equation 4, so that in a similar way as with FIGURE 1, it can further be demonstrated that the ratio $V/R$ remains constant.

Referring now to FIGURE 3, there is shown another embodiment of the invention which is a variation of the embodiment shown in FIGURE 2. According to this embodiment of the invention, instead of connecting the signal from computer 13 directly to the multiplier 14, the signal is first passed to a squaring circuit 22. In this case the square root extracting element or circuit 17 is omitted, whereby meter 16 supplies a signal which is related quadratically with the reflux flow through conduit 6. The input signal to multiplier 14 now has the value:

$$\left(k_pk_cD+k_p\tau_dk_b\frac{d\lambda}{dt}\right)^2 \quad (12)$$

and as output signal from multiplier 14 is $$k\left(k_pk_cD+k_p\tau_dk_b\frac{d\lambda}{dt}\right)^2 \quad (13)$$

In controller 15 signal (13) is now compared with the signal from flow meter 16, which is proportional to the square of the reflux flow R. The result of this comparison is an equation which but for a constant factor is equal to Equation 5, so that the desired result is obtained all the same.

It should be noted that while the embodiment of FIGURE 3 has been shown utilizing separate squaring and multiplying circuits 22 and 14 respectively, that if desired both of these circuits may be combined in one circuit. Moreover, it should be noted that the circuits 14 and 22 may be replaced by a single squaring and dividing circuit wherein the squared output of the computer 13 is divided by a constant term related to desired control ratio. In such a case however the constant introduced should have the form of $1/k$ in order that the output of the squaring-dividing circuit be equal to Equation 13 above.

Obviously various other modifications of the invention are possible in view of the above teachings. For example, while the invention has been described using electrical circuits for the control system, other forms of control systems, e.g., pneumatic, mechanical or combinations thereof, may be used. It is therefor to be understood, that the invention is not limited to the particular forms illustrated but is capable of embodiment in other forms within the scope of the appended claim.

I claim as my invention:

1. Apparatus for the automatic control of the quality of the separation of an intake mixture in a continuously operating distillation column utilizing both reflux and re-evaporation and wherein an accumulator is provided for the top product comprising:

first means for measuring the liquid level in the accumulator and producing a first output signal proportional to the difference between the measured and desired liquid levels;

second means for measuring the flow in the top liquid product discharge line from the process and producing a second output signal proportional thereto;

control means responsive to said first and second output signals for adjusting the top liquid product flow in said discharge line to maintain the liquid level in the accumulator at the desired value;

computer means responsive to said second output signal for generating a signal proportional to the sum of said second signal and the derivative thereof;

multiplying means for multiplying said sum signal by a preset constant value signal related to the desired quality of the separation;

means for measuring the reflux flow and producing an output signal related thereto; and means responsive to the output signal from said multiplying means and the output signal from said means for measuring the reflux flow for controlling the reflux flow to maintain the ratio between the vapor flow from the top of the column and the reflux flow at a substantially constant value, whereby the quality of the separation is maintained the desired value.

References Cited

UNITED STATES PATENTS

| | | | |
|---|---|---|---|
| 2,357,113 | 8/1944 | Houghland et al. | 196—132 |
| 2,976,234 | 3/1961 | Webber | 202—160 |
| 2,990,437 | 6/1961 | Berger | 202—160 |
| 3,296,241 | 1/1967 | Berger | 202—160 |

WILBUR L. BASCOMB, JR., *Primary Examiner.*